US012621618B2

(12) United States Patent
Park et al.

(10) Patent No.: US 12,621,618 B2
(45) Date of Patent: May 5, 2026

(54) METHOD FOR GUIDING MOUNTING OF WEARABLE DEVICE

(71) Applicant: SAMSUNG ELECTRONICS CO., LTD., Suwon-si (KR)

(72) Inventors: Jaesung Park, Suwon-si (KR); Seeyoun Kwon, Suwon-si (KR); Anant Baijal, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 18/618,452

(22) Filed: Mar. 27, 2024

(65) Prior Publication Data

US 2024/0276164 A1 Aug. 15, 2024

Related U.S. Application Data

(63) Continuation of application No. PCT/KR2022/015838, filed on Oct. 18, 2022.

(30) Foreign Application Priority Data

Oct. 18, 2021 (KR) ........................ 10-2021-0138803
Nov. 18, 2021 (KR) ........................ 10-2021-0159115
Jan. 6, 2022 (KR) ........................ 10-2022-0002051

(51) Int. Cl.
*H04R 29/00* (2006.01)
*H04R 1/10* (2026.01)

(52) U.S. Cl.
CPC ......... *H04R 29/001* (2013.01); *H04R 1/1016* (2013.01); *H04R 2460/15* (2013.01)

(58) Field of Classification Search
CPC . H04R 29/001; H04R 1/1016; H04R 2460/15
(Continued)

(56) References Cited

U.S. PATENT DOCUMENTS 9,532,131 B2 12/2016 Dusan
2016/0330546 A1* 11/2016 Barrentine ....... G10K 11/17857
(Continued)

FOREIGN PATENT DOCUMENTS

KR 101802764 B1 11/2017
KR 20180062270 A 6/2018
KR 20210014359 A 2/2021

OTHER PUBLICATIONS

International Search Report for PCT/KR2022/015838 mailed Feb. 2, 2023, 4 pages.

*Primary Examiner* — Ivian C Chin
*Assistant Examiner* — Con P Tran
(74) *Attorney, Agent, or Firm* — NIXON & VANDERHYE P.C.

(57) ABSTRACT

An electronic device according to various embodiments comprises: an ear tip detachable from the electronic device; a microphone; a speaker; a sensor module comprising at least one sensor configured to sense information of the electronic device; memory storing a leaking sound profile representing the relationship between the magnitude of a signal leaking out of an object on which the electronic device is mounted among signals being output from the electronic device, and the frequency of the signals being output; and at least one processor, comprising processing circuitry, operatively connected with the microphone, the speaker, and the memory. At least one processor, individually and/or collectively, may be configured to: output first signals using the speaker; use the microphone to receive a second signal leaking out of the object on which the electronic device is mounted among the first signals; obtain signal characteristics representing the relationship between a magnitude of the second signal and the frequency of the second signal; determine, based on the information obtained from the sensor module, the leaking sound profile, and the
(Continued)

comparison result of the signal characteristics, whether the electronic device is properly mounted and whether the ear tip has been properly selected; provide a mounting guide for the electronic device in response to determining that the electronic device is not properly mounted; and provide an ear tip selection guide in response to determining that the ear tip is not properly mounted.

20 Claims, 13 Drawing Sheets

(58) Field of Classification Search
USPC ... 381/58, 59, 111, 380, 87, 122, 91, 95, 26; 455/41.1, 41.2, 422.1
See application file for complete search history.

(56) References Cited

U.S. PATENT DOCUMENTS

| | | | | |
|---|---|---|---|---|
| 2017/0195795 | A1 | 7/2017 | Mei | |
| 2018/0152795 | A1 | 5/2018 | Lee | |
| 2018/0295455 | A1* | 10/2018 | Eichfeld | H04R 25/652 |
| 2020/0213702 | A1 | 7/2020 | Fujii | |
| 2020/0314526 | A1* | 10/2020 | Lee | H04R 29/001 |
| 2021/0014596 | A1* | 1/2021 | Sun | H04W 4/80 |
| 2021/0014597 | A1* | 1/2021 | Andersen | H04R 3/04 |
| 2021/0195307 | A1 | 6/2021 | Steele | |

* cited by examiner

METHOD FOR GUIDING MOUNTING OF WEARABLE DEVICE

CROSS-REFERENCE TO RELATED APPLICATIONS

This application is a continuation of International Application No. PCT/KR2022/015838 designating the United States, filed on Oct. 18, 2022, in the Korean Intellectual Property Receiving Office and claiming priority to Korean Patent Application Nos. 10-2021-0138803, filed on Oct. 18, 2021, 10-2021-0159115, filed on Nov. 18, 2021, and 10-2022-0002051, filed on Jan. 6, 2022, in the Korean Intellectual Property Office, the disclosures of each of which are incorporated by reference herein in their entireties.

BACKGROUND

Field

The disclosure relates to an electronic device and, for example, to a technology for guiding a user on properly mounting a wearable device.

Description of Related Art

In line with development of mobile communication technologies and hardware/software technologies, portable electronic devices (hereinafter, referred to as electronic devices) can output audio signals. An electronic device may be connected to a wearable device in a wired or wireless manner so as to transfer audio signals thereto. The electronic device may transfer audio signals to the wearable device using a wireless communication technology such as Bluetooth, and the wearable device may transfer audio signals to the user using a speaker mounted thereon.

The wearable device may be mounted on the user's body (for example, ears) so as to provide the user with audio signals. Wearable devices may have end portions configured in various shapes. For example, wearable devices may include an open type designed to be worn around the user's ears or a canal type designed to fit snugly inside ears. A canal-type wearable device may further include an ear tip that can be attached to/detached from an end portion. Ear tips may be manufactured in various shapes and sizes, and may be attached to electronic devices for user convenience.

When a wearable device is used while being mounted on the user's ears, audio signals may leak. For example, a large amount of audio signals leaking while music is played at a high volume may inconvenience people nearby. The amount of leakage from a wearable device may be determined by the type of the wearable device, the rear design thereof, and transducers included in the wearable device, and other factors. A wearable device including an open-type in-ear may have a larger amount of leakage than a wearable device including a closed-type in-ear. A wearable device having open-type rear design may have a larger amount of leakage than a closed-type wearable device. A wearable device including a transducer that emits sounds in both directions (for example, a planar magnetic transducer) may have a larger amount of leakage than wearable devices including other types of transducers (for example, a dynamic transducer and a balanced armature transducer).

A conventional wearable device may be structured to closely contact the object (for example, the user's ears) on which the same is mounted, in order to prevent and/or reduce audio signals output therefrom from leaking out. For example, a canal-type wearable device may be designed to have a nozzle portion inserted into the ear canal and to have an ear tip configured to block the entrance.

However, there is a problem in that, if the user incorrectly wears an in-ear-type wearable device, sounds will leak out. A canal-type wearable device has a problem in that, if the user selects an ear tip that is inappropriate for his/her physique, sounds will leak out. In such cases, users of wearable devices fail to receive audio signals with the sound quality intended by the manufacturer.

SUMMARY

Embodiments of the disclosure provide a method wherein, if a user incorrectly wears a wearable device as described above, thereby having a problem receiving the audio source, the user is guided on properly wearing the wearable device such that he/she can enjoy the sound quality intended by the manufacturer.

A wearable device according to various example embodiments may include: an ear tip configured to be attached to/detached from the wearable device, a microphone, a speaker, a sensor module including at least one sensor configured to sense information including at least one of ambient temperature, illuminance, and distance of an electronic device, a memory configured to store a leaked sound profile indicating a relation between the magnitude of signals leaked out of an object on which the wearable device is mounted, among signals output by the wearable device, and the frequency of signals which are output, and at least one processor, comprising processing circuitry, operatively connected to the microphone, the speaker, and the memory. At least one processor, individually and/or collectively, may be configured to control the wearable device to: output first signals using the speaker, receive a second signal leaked out of the object on which the electronic device is mounted, among the first signals, using the microphone, acquire signal characteristics representing a relation between the magnitude of the second signal and the frequency of the second signal, determine whether the wearable device is properly mounted and whether an ear tip attachable to/detachable from the wearable device is properly selected, based on a result of comparing information acquired from the sensor module, the leaked sound profile, and the signal characteristics, provide a wearable device mounting guide in response to determining that the wearable device is not properly mounted, and provide an ear tip selection guide in response to determining that the ear tip is not properly mounted.

A method for guiding a wearable device to be mounted according to various example embodiments may include: outputting first signals using a speaker, receiving a second signal leaked out of an object on which the wearable device is mounted, among the first signals, using a microphone, acquiring signal characteristics including the magnitude and frequency of the second signal, determining whether the wearable device is properly mounted and whether an ear tip is properly selected by comparing information acquired from a sensor module, a leaked sound profile, and the signal characteristics, providing a wearable device mounting guide in response to determining that the wearable device is not properly mounted, and providing an ear tip selection guide in response to determining that the ear tip is not properly mounted.

An electronic device according to various example embodiments may include: a display, a communication module comprising communication circuitry, a memory, and at least one processor, comprising processing circuitry, operatively connected to the display, the communication module, and the memory. At least one processor, individually and/or collectively, may be configured to: establish communication connection to a wearable device using the communication module, acquire information regarding a mounting state of the wearable device from the wearable device, and visualize the information regarding the mounting state and output the visualized information to the display.

According to various example embodiments, an electronic device may determine whether the current user has properly mounted a wearable device using a generated leaked sound profile, and may provide a guide, based thereon, such that the user can properly mount the wearable device or can select an ear tip appropriate for the user's physique.

Other advantageous effects obtainable or predictable from various example embodiments of the electronic device will be disclosed explicitly or implicitly in detailed descriptions of embodiments of the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings.

In describing the various example embodiments, descriptions related to technical contents well-known in the art and not associated directly with the disclosure may be omitted.

In addition, detailed descriptions of elements having substantially the same configuration and function may also be omitted.

For the same reason, in the accompanying drawings, some elements may be exaggerated, omitted, or schematically illustrated. Furthermore, the size of each element does not completely reflect the actual size. Therefore, the disclosure is not limited to the relative sizes or distances shown in the accompanying drawings.

Figure 1A:
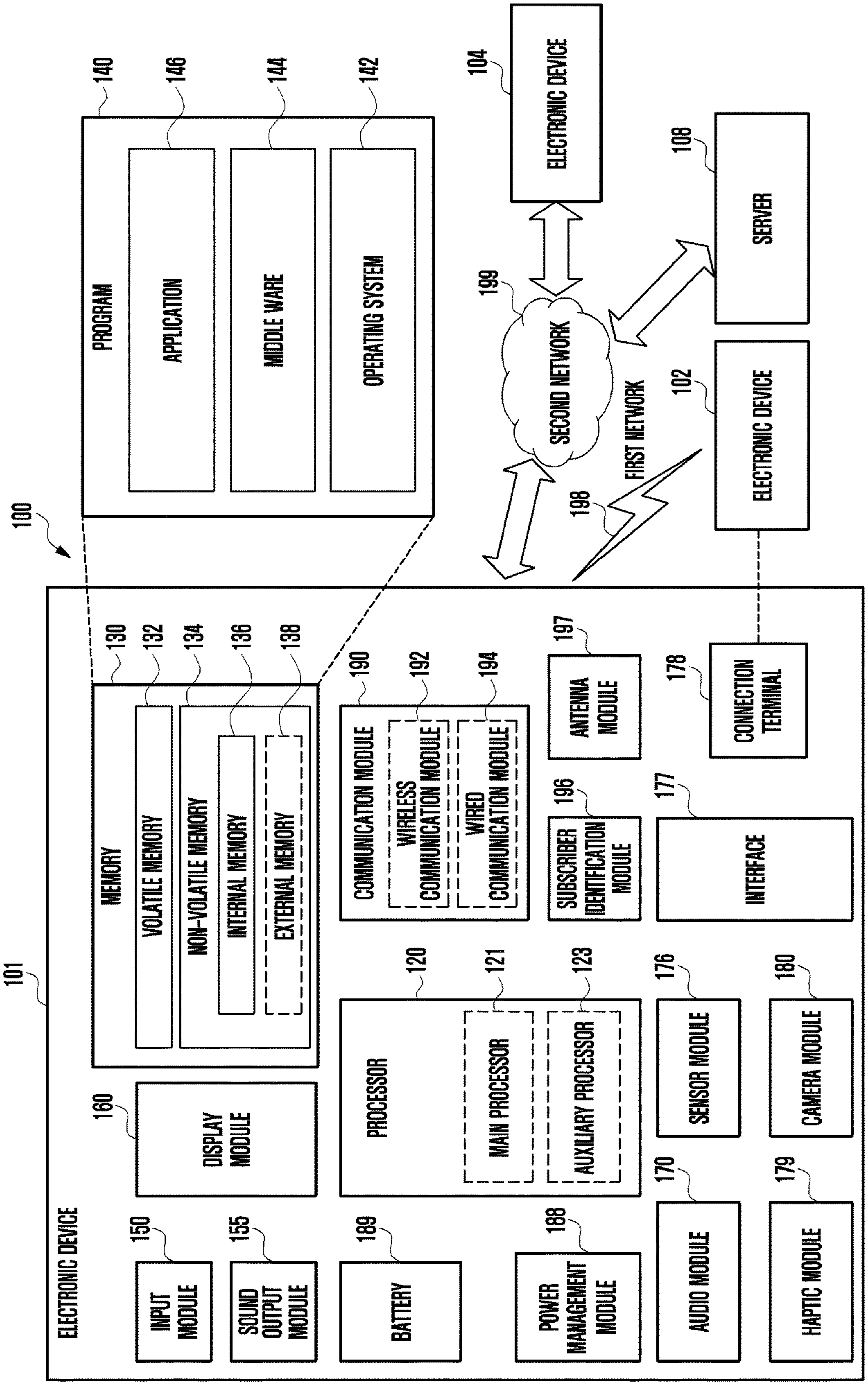
FIG. 1A is a block diagram illustrating an example electronic device in a network environment according to various embodiments.

FIG. 1A is a block diagram illustrating an example electronic device 101 in a network environment 100 according to various embodiments. Referring to FIG. 1A, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 1B:
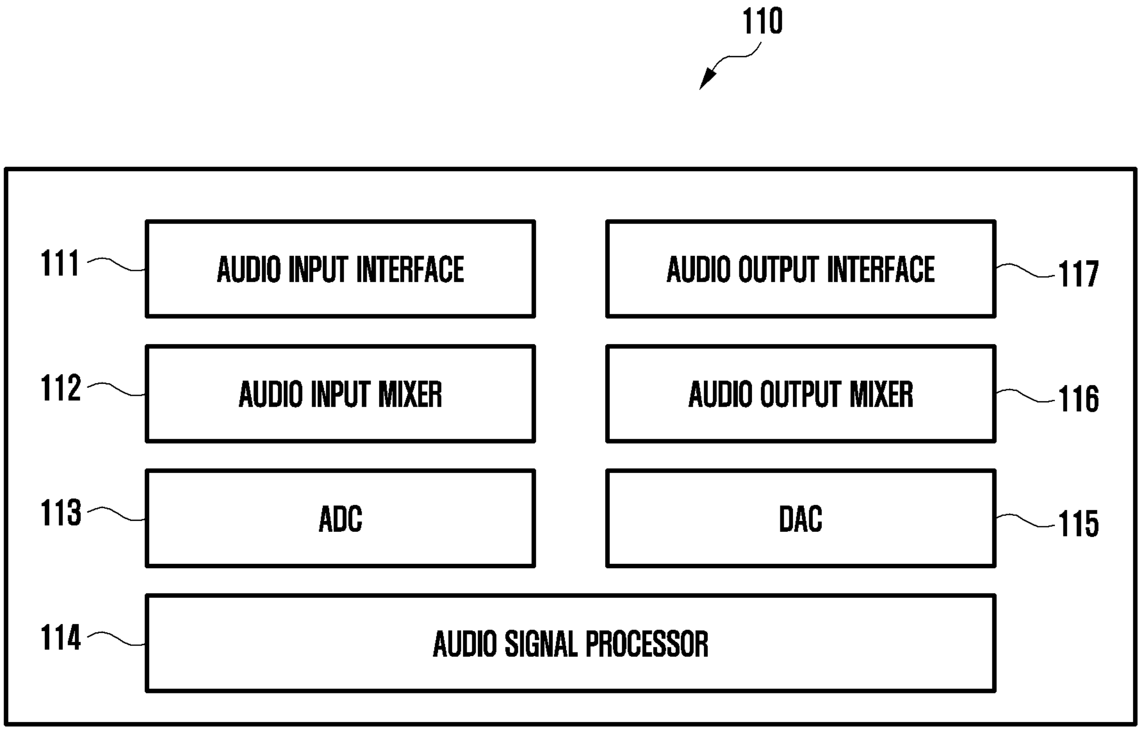
FIG. 1B is a block diagram illustrating an example configuration of a wearable device according to various embodiments.

FIG. 1B is a block diagram illustrating an example configuration of a wearable device 110 according to various embodiments. Referring to FIG. 1B, the wearable device 110 may include, for example, an audio input interface (e.g., including various circuitry) 111, an audio input mixer 112, an analog-to-digital converter (ADC) 113, an audio signal processor (e.g., including signal processing circuitry) 114, a digital-to-analog converter (DAC) 115, an audio output mixer 116, or an audio output interface (e.g., including various circuitry) 117.

The audio input interface 111 may include various circuitry and receive audio signals corresponding to sounds acquired from outside the wearable device 110 through a microphone (for example, a dynamic microphone, a condenser microphone, or a piezoelectric microphone) configured as a part of an input module or separately from the wearable device 110. For example, if an audio signal is acquired from an external device (for example, a headset or a microphone), the audio input interface 111 may be connected to the external device directly through a connection terminal or wirelessly (for example, Bluetooth communication) through a wireless communication module, thereby receiving the audio signal. According to an embodiment, the audio input interface 111 may receive a control signal (for example, a volume adjustment signal received through an input button) related to the audio signal acquired from the external device. The audio input interface 111 may include multiple audio input channels and may receive different audio signals with regard to corresponding audio input channels among the multiple audio input channels. According to an embodiment, additionally or alternatively, audio input interface 111 may receive an audio signal input from another component (for example, a processor or a memory) of the wearable device 110.

The audio input mixer 112 may mix multiple audio signals input thereto into at least one audio signal. For example, according to an embodiment, the audio input mixer 112 may mix multiple analog audio signals input through the audio input interface 111 into at least one analog audio signal.

The ADC 113 may convert an analog audio signal into a digital audio signal. For example, according to an embodiment, the ADC 113 may convert an analog audio signal received through the audio input interface 111 or, additionally or alternatively, an analog audio signal mixed through the audio input mixer 112 into a digital audio signal.

The audio signal processor 114 may include various signal processing circuitry and perform various kinds of processing with regard to digital audio signals input through the ADC 113, or digital audio signals received from other components of the wearable device 110. For example, according to an embodiment, the audio signal processor 114 may perform sampling rate change with regard to one or more digital audio signals, application of one or more filters, interpolation processing, amplification or attenuation of all or some frequency bands, noise processing (for example, noise or echo attenuation), channel change (for example, switching between mono and stereo), mixing, or designated signal extraction. According to an embodiment, one or more functions of the audio signal processor 114 may be implemented as equalizers.

The DAC 115 may convert digital audio signals into analog audio signals. For example, according to an embodiment, the DAC 115 may convert digital audio signals processed by the audio signal processor 114 or digital audio signals acquired from other components (for example, the processor or the memory) of the wearable device 110 into analog audio signals.

The audio output mixer 116 may mix multiple audio signals to be output into at least one audio signal. For example, according to an embodiment, the audio output mixer 116 may mix an audio signal converted to an analog audio signal through the DAC 115 and another analog audio signal (for example, an analog audio signal received through the audio input interface 111) into at least one analog audio signal.

The audio output interface 117 may output an analog audio signal converted through the DAC 115 or, additionally or alternatively, an analog audio signal mixed through the audio output mixer 116 to the outside of the wearable device 110 through a sound output module. The sound output module may include, for example, a speaker such as a dynamic driver or a balanced armature driver, or a receiver. According to an embodiment, the sound output module may include multiple speakers. In such a case, the audio output interface 117 may output audio signals having multiple channels (for example, stereo or 5.1 channels) different from each other through at least some of the multiple speakers. According to an embodiment, the audio output interface 117 may be connected to an external device (for example, an external speaker or headset) directly through a connection terminal or wirelessly through a wireless communication module, thereby outputting audio signals.

According to an embodiment, instead of separately including the audio input mixer 112 or the audio output mixer 116, the wearable device 100 may mix multiple digital audio signals using at least one function of the audio signal processor 114, thereby generating at least one digital audio signal.

According to an embodiment, the wearable device 110 may include an audio amplifier (not illustrated) (for example, a speaker amplification circuit) capable of amplifying an analog audio signal input through the audio input interface 111, or an audio signal to be output through the audio output interface 117. According to an embodiment, the audio amplifier may be configured as a separate module from the wearable device 110.

Figure 2A:
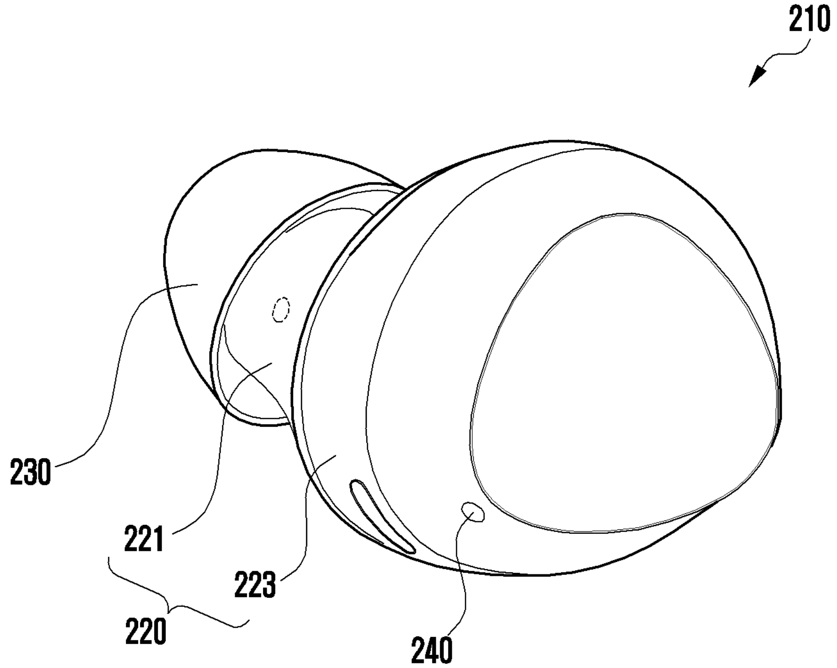
FIG. 2A and FIG. 2B are perspective views of a wearable device according to various embodiments.
Figure 2B:
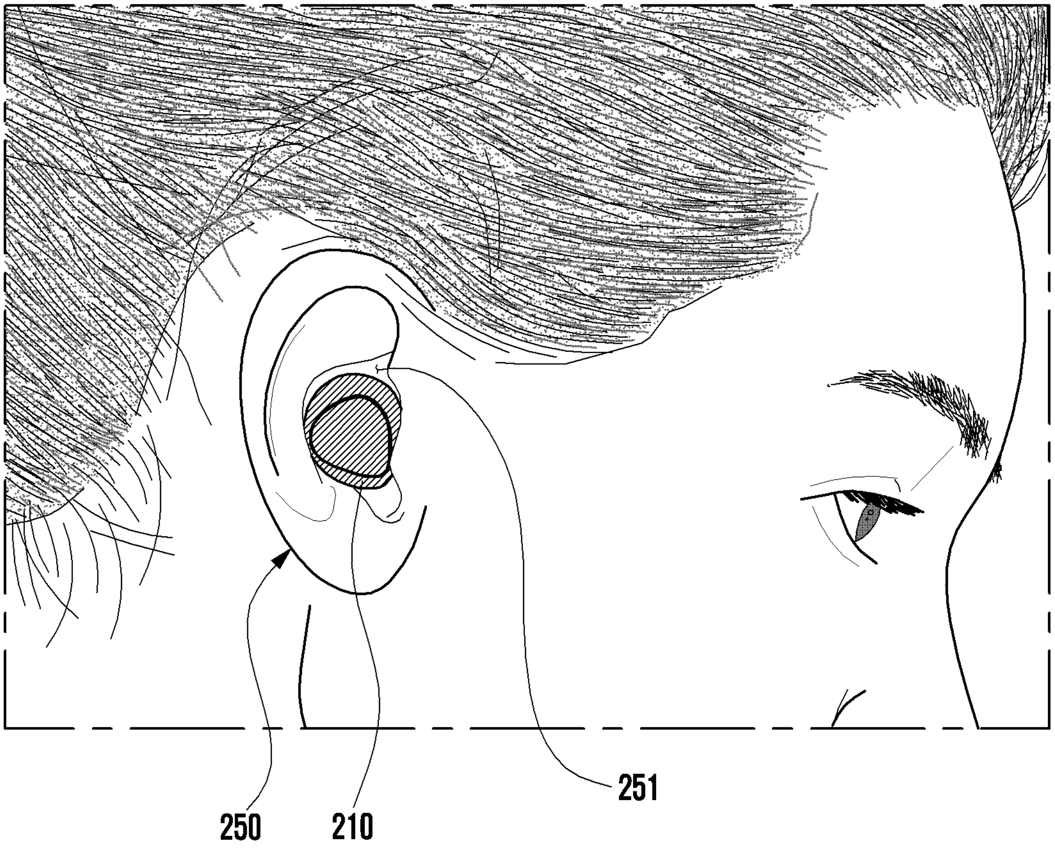

FIG. 2A and FIG. 2B are perspective views illustrating an example wearable device according to various embodiments.

According to various embodiments, the wearable device 210 (for example, a wireless earphone) may include additional devices for performing functions of the wearable device 210. In an embodiment, the additional devices may include a speaker, a microphone, a sensor (for example, a touch sensor, a proximity sensor, or an optical sensor), a communication module (for example, a charging or data input/output port, or an audio input/output port), and/or various physical/software buttons.

According to various embodiments, the wearable device 210 may include a first audio output device and a second audio output device. At least one of the first and second audio output devices may be connected to an electronic device (for example, the electronic device 101 in FIG. 1A). The electronic device may be connected to the wearable device 210 (the first and second audio output devices) in a direct paring (or single paring) type, based on wireless communication (for example, Bluetooth or Bluetooth low energy (BLE)), or connected to each of the first and second audio output devices in a multi-paring type.

For example, the wearable device 210 may control a task (or a first function) to be performed through at least one of the first audio output device and/or the second audio output device while interworking with the electronic device. The task may include, for example, an audio output function based on the first audio output device and/or the second audio output device, a user health coaching function, and/or an audio output function based on call connection. According to an embodiment, the audio output may include, for example, designated audio technology such as stereo audio output based on the first audio output device (for example, left (L)) and the second audio output device (for example, right (R)), or mono audio output based on the first audio output device and/or the second audio output device.

According to various embodiments, the wearable device 210 may be wirelessly connected to the electronic device and configured to receive an audio signal output from the electronic device and output the same through a speaker (or a receiver), or transmit an audio signal input from the outside (for example, the user) through a microphone of the wearable device 210 (for example, the first audio output device and/or the second audio output device) to the electronic device. According to various embodiments, the wearable device 210 may execute (for example, play) data (for example, audio data) stored in the memory (not illustrated) of the wearable device 210 and/or sensor data (for example, touch data, position data, biometric signal data) and may output audio signals through the speaker (or receiver).

According to various embodiments, the wearable device 210 including the first audio output device and the second audio output device may be worn on a part of the user's body (for example, the left or right ear) and may provide sound information (or audio signals) through the speaker included therein.

FIG. 2A is a perspective view of a wearable device 210 (a wireless audio output device) according to various embodiments. FIG. 2B illustrates a wearable device 210 coupled to the user's ear according to various embodiments.

Referring to FIG. 2A and FIG. 2B, in various embodiments, the wearable device 210 may include a housing 220 or an ear tip 230.

The housing 220 may be configured such that the same can be attached to/detached from the user's ear 250, for example. According to an embodiment, the housing 220 may include a first portion 221, at least a part of which can be inserted into the external auditory meatus (not illustrated) of the ear 250, and a second portion 223 which can be seated in concha 251 of the auricle connected to the external auditory meatus. The wearable device 210 (for example, an ear wearable device) may include a speaker positioned inside the housing 220. Sounds output from the speaker may be released through the first portion 221 inserted into the external auditory meatus of the ear 250 and transferred to the tympanic membrane of the ear 250. At least a part of the housing 220 may be made of various materials such as polymer or metal.

The ear tip 230 may be coupled to the first portion 221 of the housing 220, for example. The ear tip 230 may be a flexible member including a cavity, and the first portion 221 of the housing 220 may be inserted into a conduit of the ear tip 230. For example, the ear tip 230 may be seated in a groove formed on the first portion 221 of the housing 220 and coupled to the first portion 221. When the first portion 221 of the housing 220 is inserted into the external auditory meatus of the ear 250, the eat tip 230 may be elastically disposed between the external auditory meatus of the ear 250 and the first portion 221 of the housing 221. The ear tip 230 can be attached to/detached from the first portion 221 of the housing 220, and may include various sizes and shapes.

According to an embodiment, the first portion 221 of the housing 220 may have a microphone hole 240 formed therein. The microphone hole 240 may be exposed to the outside when the wearable device 210 is worn on the user's ear 250. The position or number of the microphone hole 240 is not limited to the example in FIG. 2 and may be varied.

Figure 3:
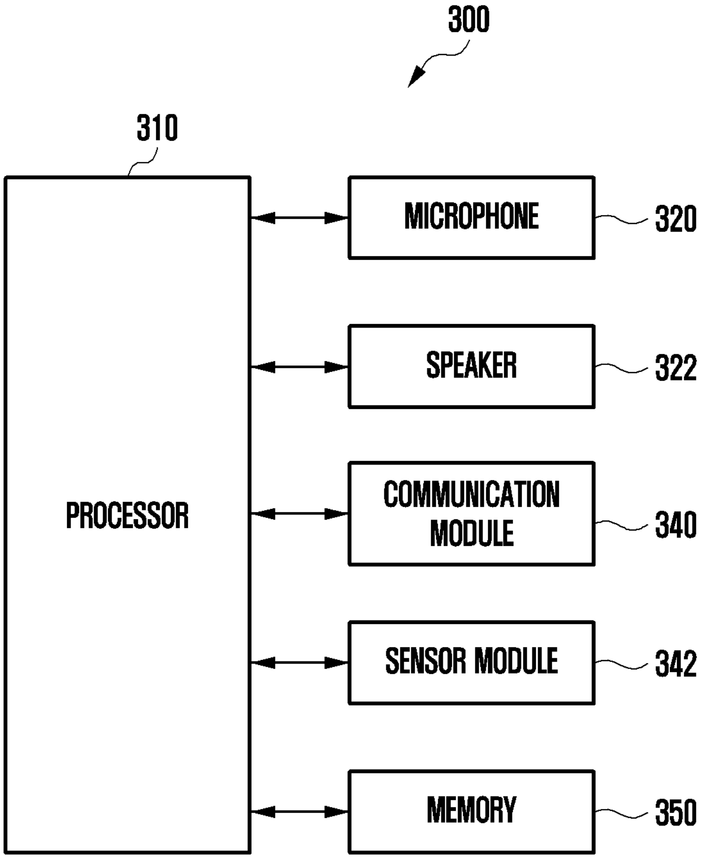
FIG. 3 is a block diagram illustrating an example configuration of a wearable device according to various embodiments.

FIG. 3 is a block diagram illustrating an example configuration of a wearable device according to various embodiments.

Referring to FIG. 3, the wearable device 300 (for example, the wearable device 210 in FIG. 2) may include a microphone 320, a speaker 322, a communication module (e.g., including various communication circuitry) 340, a sensor module (e.g., including at least one sensor) 342, a second processor (e.g., including processing circuitry) 310, and a memory 350, and in various embodiments, some of the illustrated components may be omitted or replaced. At least some of respective components of the wearable device 300 illustrated (or not illustrated) may be connected to each other operatively, functionally, and/or electrically.

According to various embodiments, the microphone 320 may collect external sounds such as the user's voice and may convert the same into digital data (audio signals). According to various embodiments, the wearable device 300 may include the microphone 320 on a part of the housing (not illustrated) thereof, or may receive audio signals collected by an external microphone connected thereto in a wired/wireless manner. The wearable device 300 may include at least one microphone 320. For example, the wearable device 300 may include an inner microphone for collecting audio signals input inside the object on which the wearable device 300 is mounted, a first external microphone for collecting leaked signals which leaked out of the object on which the wearable device 300 is mounted, among audio signals outside the object on which the wearable device 300 is mounted, and a second external microphone for collecting external signals.

According to various embodiments, the speaker 322 may output various sounds provided from the processor 310. If the electronic device (for example, the electronic device 101 in FIG. 1A) switches to a speaker phone mode while executing a telephone call function, counterpart audio signals received from the counterpart electronic device may be output through the speaker 322 of the wearable device 300.

According to various embodiments, the communication module 340 may include various communication circuitry and communicate with the electronic device through a wireless network under the control of the processor 310. The communication module 340 may include hardware and software modules for transmitting/receiving data from a cellular network (for example, a long term evolution (LTE) network), a 5G network, a new ratio (NR) network, and/or a short-range network (for example, Wi-Fi or Bluetooth).

According to various embodiments, the sensor module 342 may include at least one sensor and sense the operating state (for example, power or temperature) of the wearable device 300 or external environment state (for example, user state) and may generate an electric signal or a data value corresponding to the sensed state. According to an embodiment, the sensor module 342 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to various embodiments, the memory 350 may include a volatile memory and a nonvolatile memory so as to store various pieces of data temporarily or permanently. According to various embodiments, the memory 350 may store various instructions which may be performed in the processor 310. Such instructions may include control commands, such as arithmetic and logical operations, data movements, and inputs/outputs, which can be recognized by the processor 310.

According to various embodiments, the second processor 310 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second processor 310 may, for example, be connected to respective components (for example, the microphone 320, the speaker 322, the communication module 340, the sensor module 342, and the memory 350) of the wearable device 300 operatively, functionally, and/or electrically, thereby performing operations or data processing related to control and/or communication of respective components. The processor of the wearable device will hereinafter be referred to as a second processor 310 to be distinguished from the processor 120 of the electronic device. Operations described hereinafter may be performed through interaction between the processor 120 of the electronic device and the second processor 310 of the wearable device, but are not limited thereto.

According to various embodiments, operation and data processing functions that the processor 120 and the second processor 310 may implement on the electronic device 101 and the wearable device 300 are not limited, but various embodiments for guiding the wearable device 300 to be mounted properly will be described hereinafter. Operations of the processor 120 and the second processor 310 described below may be performed by loading instructions stored in the memory 350.

According to various embodiments, the electronic device may undergo a learning step and an application step in order to guide the user on properly mounting the same. The method in which the electronic device provides the user with a mounting guide will hereinafter be divided into a learning step and an application step and described accordingly.

Example Learning Step

According to various embodiments, the wearable device 300 and the ear tip attached to the wearable device 300 may be mounted on various dummy heads. The dummy heads may be models fabricated in the shape of human heads. According to an embodiment, the wearable device 300 and the ear tip may be mounted to closely contact dummy heads. According to an embodiment, the dummy heads may have various shapes, and respective dummy heads may include ear models fabricated differently. The wearable device 300 may be mounted appropriately for ear models of various dummy heads in order to generate a leaked sound profile. According to an embodiment, the wearable device 300 may be mounted on a dummy head with a different ear tip attached to an end portion thereof. For example, the wearable device 300 may be mounted on a first or second dummy head with a first or second ear tip attached to an end portion thereof, respectively.

According to various embodiments, the second processor 310 may output a test signal (for example, a sine swipe) using the speaker 322. The test signal may be output to acquire data for generating a leaked sound profile by the second processor 310, and the test signal may include various frequency bands (for example, bass-range, mid-range, treble-range). According to an embodiment, even when the wearable device 300 closely contacts the ear model of a dummy head, at least some test signals that have been output may leak out of the dummy head. In the following description, signals leaked out of the dummy head, among signals output by the wearable device 300, will be defined as leaked signals.

According to various embodiments, the second processor 310 may adjust the volume level of test signals output thereby. The second processor 310 may acquire audio signals, based on various volume levels of test signals and external environments. The second processor 310 may acquire audio signals after the wearable device 300 is properly mounted on an ear model.

According to various embodiments, the second processor 310 may receive leaked signals using the microphone 320. According to an embodiment, the second processor 310 may receive audio signals including leaked signals and external signals caused by noise occurring in the periphery, using the microphone 320. In the following description, signals collected in the external environments other than signals output by the wearable device 300 will be defined as external signals. The processor 120 may generate a loop such that leaked signals and external signals can be distinguished among audio signals. For example, the second processor 310 may acquire signals received inside ears of the dummy head, leaked signals received from the outside, and external signals using multiple microphones 320, and may transmit the same to the electronic device 101. The processor 120 may separate leaked signals and external signals from signals received from the wearable device using the loop, and may generate a leaked sound profile using the leaked signals.

According to various embodiments the processor 120 may analyze leaked signals, thereby identifying the magnitude of leaked signals leaked at respective volumes and frequencies. The processor 120 may generate a leaked sound profile, based on the analysis of leaked signals. According to an embodiment, the processor 120 may store the leaked sound profile as a lookup table (LUT). The leaked sound profile may include information indicating to what extent audio signals output by the wearable device 300 leak, and in what frequency bands. The leaked sound profile may be information acquired while the wearable device 300 is properly mounted on the ear model, and may be used as a reference for determining whether the wearable device 300 is properly worn by the user, and whether an appropriate ear tip is selected by the user. For example, the leaked sound profile may indicate a graph representing the degree of signal leakage occurring in respective frequency bands. Signal leakage indicated by the leaked sound profile may indicate that the wearable device 300 is mounted in an optimal state in which the user is provided with the highest sound quality.

According to various embodiments, the processor 120 may generate different leaked sound profiles, depending on the type of the ear tip attached to the wearable device 300. For example, the processor 120 may generate a first leaked sound profile if a first ear tip is attached to the wearable device 300, and may generate a second leaked sound profile if a second ear tip is attached to the wearable device 300.

According to an embodiment, the processor 120 may store generated leaked sound profiles in an external server. The processor 120 may establish communication connection with the external server and may transmit leaked sound profiles to the external server. According to an embodiment, the processor 120 may store leaked sound profiles in the electronic device's own memory.

Example Application Step

According to various embodiments, the second processor 310 may acquire information such as temperature, illuminance, and pressure from the sensor module 342. For example, the sensor module 342 may sense information such as temperature, illuminance, and pressure while the wearable device 300 is mounted on the user's ear. The value of information sensed by the sensor module 342 may vary depending on the state in which the wearable device 300 is mounted on the user's ear. For example, if the wearable device 300 closely contacts the user's ear, a high temperature, a low illuminance, and a high pressure may be measured. On the other hand, if the wearable device 300 does not closely contact the user's ear, a low temperature, a high illuminance, and a low pressure may be measured. The processor 310 may acquire information including at least one of temperature, illuminance, and pressure from the sensor module 342 while the wearable device 300 is mounted on the user's ear. The second processor 310 may transmit sensed information to the electronic device. the processor 120 may determine whether the wearable device 300 closely contacts the user's ear using the received information.

According to various embodiments, the second processor 310 may output source signals using the speaker 322. The source signals may be audio signals including various frequency bands. The speaker 322 may be positioned on an end portion of the wearable device 300 so as to output source signals into the user's ear. The second processor 310 may receive audio signals including external signals and source signals that have been output, through the microphone 320. For example, the second processor 310 may receive source signals output into the ear using an internal microphone designed to be positioned in the user's ear. The second processor 310 may receive external signals and leaked signals leaked out of the ear using at least one external microphone designed to be positioned outside the user's ear. According to an embodiment, the second processor 310 may acquire signal characteristics including the frequency and magnitude of acquired leaked signals and transmit the same to the electronic device.

According to various embodiments, the processor 120 may determine, based on a leaked sound profile, whether the wearable device 300 is properly mounted, and whether the ear tip is properly mounted. According to an embodiment, the processor 120 may determine a leaked sound profile and signal characteristics of an acquired leaked signal, thereby determining whether the wearable device 300 is properly mounted, and whether the ear tip is properly mounted. For example, the processor 120 may compare a leaked sound level mapped to a mid-range frequency band in a leaked sound profile with the magnitude of a leaked signal currently received by the microphone 320. If the magnitude of the currently collected leaked signal is larger than the leaked sound profile value, the processor 120 may determine that the wearable device 300 is not properly mounted. On the other hand, if the magnitude of the currently collected leaked signal is similar to the leaked sound profile value, the processor 120 may determine that the wearable device 300 is properly mounted. The processor 120 may similarly determine whether the ear tip is properly mounted. For example, the processor 120 may compare a leaked sound level mapped to a mid-range frequency band in a leaked sound profile with the magnitude of a leaked signal currently received by the microphone 320. If the magnitude of the currently collected leaked signal is larger than the leaked sound profile value, the processor 120 may determine that the ear tip is not properly mounted. According to an embodiment, the processor 120 may distinguish, based on signal characteristics of a leaked signal, whether the wearable device is properly mounted, and whether the ear tip is properly selected. For example, the frequency spectrum power of the leaked signal when the wearable device 300 is erroneously mounted by the user may differ from that when the ear tip is erroneously mounted by the user. According to an embodiment, the processor 120 may determine whether the wearable device 300 is properly mounted, based on information (for example, temperature information, illuminance information, pressure information) acquired from the sensor module 342. For example, the processor 120 may acquire temperature information from the sensor module 342 and, if the current temperature is below a reference temperature, determine that the wearable device 300 does not closely contact the user's ear. If the wearable device 300 does not make close contact, the measured current temperature may be close to the normal human body temperature, and if the wearable device 300 makes close contact, the measured current temperature may be higher than the normal human body temperature. For example, the processor 120 may acquire pressure information from the sensor module 342 and, if the current pressure is below a reference pressure, may determine that that the wearable device 300 does not closely contact the user's ear. According to an embodiment, the processor 120 may determine whether the ear tip is properly mounted, based on the current user's physique. For example, the processor 120 may compare the size of the inner space of the user's ear and the size of the ear tip, thereby determining whether the ear tip is properly mounted.

According to various embodiments, in response to determining that the wearable device 300 is not properly mounted, the processor 120 may transmit a guide for proper mounting of the wearable device 300 to the wearable device, based on a leaked sound profile. For example, if the wearable device 300 is loosely worn by the user, or if the left and right sides of the wearable device 300 worn on the user are reversed, the processor 120 may determine that wearable device 300 is not properly mounted. In this case, the processor 120 may transmit a notice to the wearable device 300 such that the wearable device is worn properly.

According to various embodiments, in response to receiving a notice regarding the state of mounting of the wearable device 300 from the electronic device, the second processor 310 may output an audio notice regarding how to properly wear the wearable device 300 using the speaker 322. For example, if the left and right sides of the wearable device 300 worn on the user are reversed, the second processor 310 may provide the user with an audio notice such as "Switch the left and right sides of the earphone worn on you" through the speaker 322. If the wearable device 300 is loosely worn by the user, the second processor 310 may provide the user with an audio notice such as "Wear your earphone more snugly in your ear" through the speaker 322.

According to various embodiments, in response to determining that the ear tip is erroneously selected although the wearable device 300 is properly mounted, the processor 120 may transmit a guide for selecting the ear tip attached to the wearable device 300 to the wearable device 300, based on a leaked sound profile. The processor 120 may determine, based on the currently received leaked signal and an external signal, that, although the wearable device 300 is currently worn on the user properly, the ear tip is not appropriate for the user's physique. According to an embodiment, if the user selected an ear tip having a size inappropriate for the internal structure of the user's ear, the processor 120 may provide a notice such that another ear tip is selected. For example, the processor 120 may transmit a guide regarding proper ear tip mounting to the wearable device, and the second processor 310 may output the received guide using the speaker 322.

Figure 4A:
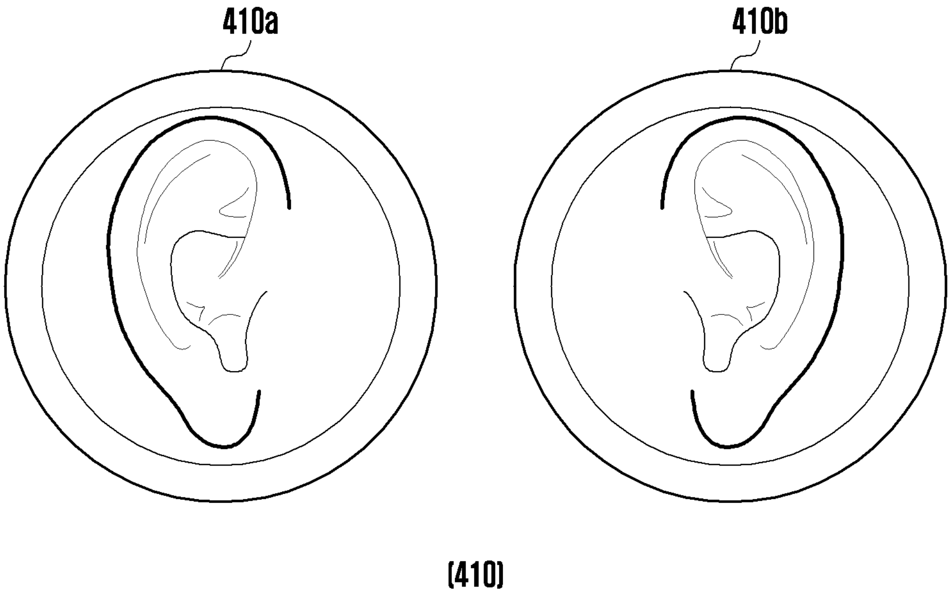
FIG. 4A and FIG. 4B are diagrams illustrating an ear model and a dummy head, respectively, on which a wearable device is mounted according to various embodiments.
Figure 4B:
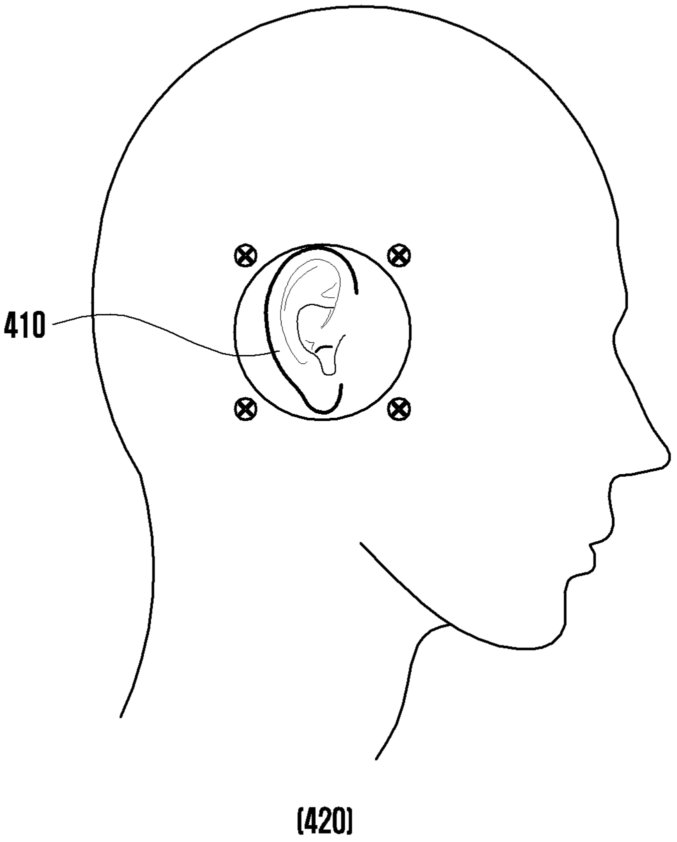

FIG. 4A and FIG. 4B are diagrams illustrating an example ear model and a dummy head, respectively, on which a wearable device is mounted according to various embodiments.

Referring to FIG. 4A, the wearable device (for example, the wearable device 210 in FIG. 2) may be mounted on the ear module 410 so as to perform learning for generating a leaked sound profile in a learning step. According to an embodiment, the ear model 410 may include a first model 410*a* modeled after the user's left ear and a second model 410*b* modeled after the right ear. The wearable device may be mounted on the first model 410*a* and/or the second model 410*b* so as to perform learning for generating a leaked sound profile in a state similar to a case in which the wearable device is actually worn on the user.

For example, the wearable device may be mounted on first model 410_a_ and/or the second model 410_b_. The second processor (for example, the processor 310 in FIG. 3) may output a test signal through the speaker (for example, the speaker 322 in FIG. 3) after the wearable device is mounted on the ear model 410. The second processor may receive a test signal, a leaked signal, and an external signal using at least one microphone (for example, the microphone 320 in FIG. 3). For example, the second processor may receive at least a part of a test signal using a first microphone mounted inside the ear model 410, may receive a leaked signal of the test signal using a second microphone mounted on the outside of the ear model 410, and may receive an external signal using a third microphone mounted on the outside of the ear model 410.

Referring to FIG. 4B, the ear model 410 in FIG. 4A may be attached to the dummy head 420 which is a cast of a human head. The wearable device may be mounted on the ear model 410 attached to the dummy head 420 so as to perform an operation for generating a leaked sound profile. For example, in order to generate leaked sound profile regarding various shapes of ears, the wearable device may receive test signals, leaked signals, and external signals using various shapes of ear models 410 and dummy heads 420. The processor 120 may receive the test signals, leaked signals, and external signals from the second processor 310, thereby generating a leaked sound profile.

Figure 5:
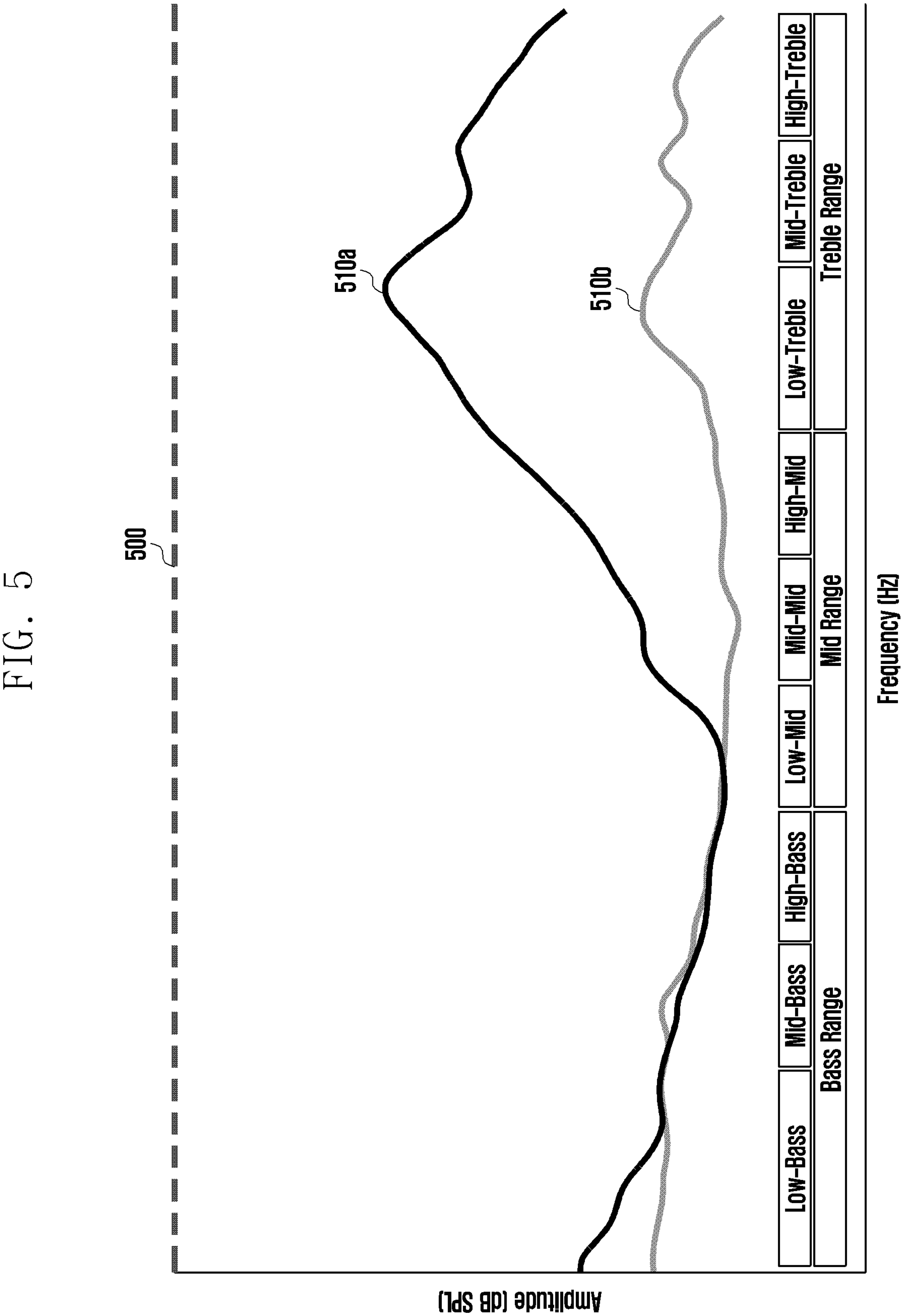
FIG. 5 is a graph illustrating a leaked sound profile of a wearable device according to various embodiments.

FIG. 5 is a graph illustrating an example leaked sound profile of a wearable device according to various embodiments.

According to various embodiments, the processor (for example, the processor 120 in FIG. 1A) may generate a leaked sound profile indicating the relation between the frequency and the magnitude of leaked signals. According to an embodiment, the processor may map the magnitude of leaked signals regarding various frequency bands. For example, frequency bands may be largely divided into bass-range, mid-range, and treble-range frequency bands, and respective frequency bands may include subdivided ranges of frequency bands. For example, the bass-range frequency band may include low-bass, mid-bass, and high-bass frequency bands, the mid-range frequency band may include low-mid, mid-mid, and high-mid frequency bands, and the treble-range frequency band may include low-treble, mid-treble, and high-treble frequency bands. The processor may map the magnitude of leaked signals against the magnitude 500 of output signals with regard to each frequency, thereby generating a leaked sound profile.

According to various embodiments, the processor may generate a leaked sound profile using an ear model and a dummy head in the learning step. The first graph 510_a_ and the second graph 501_b_ in FIG. 5 illustrate a leaked sound profile generated by the processor in the learning step. According to an embodiment, the leaked sound profile may vary depending on the type of the wearable device (for example, the wearable device 210 in FIG. 2) and the type of the ear tip. According to an embodiment, if a leaked sound profile is generated by changing the ear tip only in the same wearable device, the generated leaked sound profile may have a similar contour. For example, the leaked sound profile of a wearable device having a first ear tip attached thereto may appear as in the first graph 510_a_, and the leaked sound profile of a wearable device having a second ear tip attached thereto may appear as in the second graph 510_b_. Referring to the first graph 501_a_, the wearable device having a first ear tip attached thereto may have the large amount of source signal leakage occurring in the mid-treble frequency band. On the other hand, the leaked sound profile of the wearable device having a second ear tip attached thereto may have a large amount of source signal leakage occurring in the low-treble frequency band.

According to various embodiments, the processor may provide the user with a guide to properly mount the wearable device and the ear tip, based on the leaked sound profile generated in the learning step. For example, the processor may identify the frequency band of a received leaked signal, and may identify the magnitude of a leaked signal mapped to the same frequency band in the leaked sound profile. If the magnitude of the currently received leaked signal is smaller than or equal to values mapped in the graphs 510_a_ and 510_b_, it may be determined that the wearable device and the ear tip are properly mounted. The processor may otherwise determine that the wearable device and the ear tip are not properly mounted, and may provide a guide for proper mounting.

A wearable device according to various example embodiments may include: an ear tip configured to be attached to/detached from the wearable device, a microphone, a speaker, a sensor module comprising at least one sensor configured to sense information including at least one of ambient temperature and illuminance of the wearable device, a memory configured to store a leaked sound profile indicating a relation between the magnitude of signals leaked out of an object on which the wearable device is mounted, among signals output by the wearable device, and the frequency of signals which are output, and at least one processor, comprising processing circuitry, operatively connected to the microphone, the speaker, and the memory. At least one processor, individually and/or collectively, may be configured to control the wearable device to: output first signals using the speaker, receive a second signal leaked out of the object on which the wearable device is mounted, among the first signals, using the microphone, acquire signal characteristics representing a relation between the magnitude of the second signal and the frequency of the second signal, determine whether the wearable device is properly mounted and whether the ear tip is properly selected, based on a result of comparing information acquired from the sensor module, the leaked sound profile, and the signal characteristics, provide a wearable device mounting guide in response to determining that the wearable device is not properly mounted, and provide an ear tip selection guide in response to determining that the ear tip is not properly mounted.

According to various example embodiments, at least one processor, individually and/or collectively, may be configured to: output test signals using the speaker, and generate the leaked sound profile by mapping the magnitude of sounds leaked out of the object on which the wearable device is mounted, among the test signals, and the frequency band of the test signals.

According to various example embodiments, at least one processor, individually and/or collectively, may be configured to receive an external signal occurring outside the wearable device using the microphone, and generate the leaked sound profile, further based on the magnitude of the external signal.

According to various example embodiments, at least one processor, individually and/or collectively, may be configured to distinguish the second signal and the external signal, among signals received by the microphone, using a feedback loop.

According to various example embodiments, at least one processor, individually and/or collectively, may be configured to generate the leaked sound profile using an artificial intelligence algorithm.

According to various example embodiments, at least one processor, individually and/or collectively, may be configured to further determine whether the wearable device is properly mounted, based on the magnitude of the first signals.

According to various example embodiments, at least one processor, individually and/or collectively, may be configured to provide a wearable device mounting guide or an ear tip selection guide by providing an audio notice using the speaker.

According to various example embodiments, at least one processor, individually and/or collectively, may be configured to provide the wearable device mounting guide or the ear tip selection guide, based on physical characteristics of a user on which the wearable device is mounted.

According to various example embodiments, the wearable device may further include a communication module comprising communication circuitry, and at least one processor, individually and/or collectively, may be configured to establish communication connection to an external server using the communication module, and acquire the leaked sound profile from the external server and store the acquired leaked sound profile in the memory.

According to various example embodiments, at least one processor, individually and/or collectively, may be configured to store the leaked sound profile as a lookup table (LUT).

According to various example embodiments, an electronic device may include: a display, a communication module comprising communication circuitry, a memory, and at least one processor, comprising processing circuitry, operatively connected to the display, the communication module, and the memory. At least one processor, individually and/or collectively, may be configured to: establish communication connection to a wearable device using the communication module, acquire information regarding a mounting state of the wearable device from the wearable device, and visualize the information regarding the mounting state and output the visualized information to the display.

According to various example embodiments, at least one processor, individually and/or collectively, may be configured to: execute a determined application, generate graphic object indicating a method for mounting the external device, based on an input regarding the application, and output the generated graphic object to the display such that the method for mounting the external device is provided as a guide.

Figure 6:
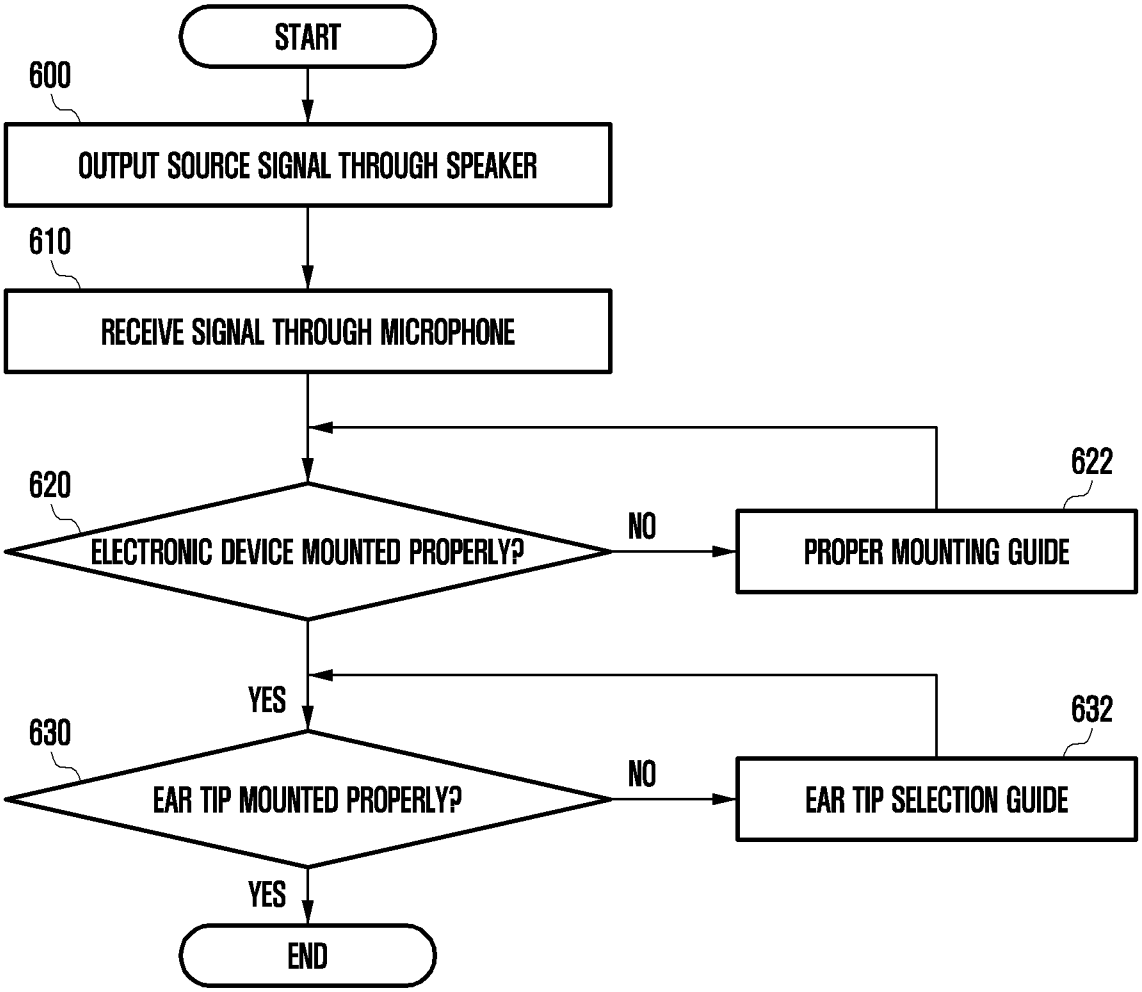
FIG. 6 is a flowchart illustrating an example method for guiding a wearable device to be mounted properly according to various embodiments.

FIG. 6 is a flowchart illustrating an example method for guiding a wearable device to be mounted properly according to various embodiments.

The method illustrated in FIG. 6 may be performed by the electronic device (for example, the electronic device 101 in FIG. 1A) and the wearable device (for example, the wearable device 110 in FIG. 1B) illustrated with reference to FIG. 1 to FIG. 5, and descriptions of technical features described above may not be repeated here.

According to various embodiments, in operation 600, the wearable device may output a source signal through a speaker (for example, the speaker 322 in FIG. 3). The source signal may be an audio signal including various frequency bands. The speaker may be positioned on an end portion of the wearable device so as to output the source signal into the user's ear. The wearable device may receive an audio signal including the source signal that has been output and an external signal through a microphone (for example, the microphone 320 in FIG. 3). The wearable device may receive a leaked signal which is leaked out of the ear and an external signal using at least one external microphone designed to be positioned outside the user's ear. According to an embodiment, the wearable device may acquire signal characteristics including the frequency and magnitude of the acquired leaked signal.

According to various embodiments, in operation 610, the wearable device may receive an audio signal through the microphone. According to an embodiment, the wearable device may receive an audio signal including a leaked signal and an external signal caused by noise occurring in the periphery, using the microphone. The electronic device may generate a loop such that the leaked signal and the external signal can be distinguished in the audio signal. The electronic device may separate the leaked signal and the external signal using the loop, and may generate a leaked sound profile using the leaked signal.

According to various embodiments, in operation 620, the electronic device may determine whether the wearable device is properly mounted. According to an embodiment, the electronic device may compare the leaked sound profile and signal characteristics of the acquired leaked signal, thereby determining whether the wearable device is properly mounted. For example, the electronic device may compare a leaked sound level mapped to the mid-range frequency band in the leaked sound profile and the magnitude of the leaked signal currently received through the microphone. If the magnitude of the currently collected leaked signal is larger than the leaked sound profile value, the electronic device may determine that the wearable device is not properly mounted. On the other hand, if the magnitude of the currently collected leaked signal is similar to the leaked sound profile value, the electronic device may determine that the wearable device is properly mounted.

According to various embodiments, in operation 622, the electronic device may provide the user with a guide for properly mounting the wearable device. In response to determining that the wearable device is not properly mounted, the electronic device may provide the user with a guide for properly mounting the wearable device, based on a leaked sound profile. For example, if the wearable device is loosely worn by the user, or if the left and right sides of the wearable device worn on the user are reversed, the electronic device may determine that wearable device is not properly mounted. In this case, the electronic device may transmit a notice such that the wearable device is worn properly.

According to various embodiments, the electronic device may output an audio notice regarding how to properly wear the wearable device using the speaker. For example, if the left and right sides of the wearable device worn on the user are reversed, the electronic device may provide the user with an audio notice such as "Switch the left and right sides of the earphone worn on you" through the speaker. If the wearable device is loosely worn by the user, the electronic device may provide the user with an audio notice such as "Wear your earphone more snugly in your ear" through the speaker.

According to various embodiments, in operation 630, the electronic device may determine whether the ear tip is properly mounted. The electronic device may compare the leaked sound profile and signal characteristics of the acquired leaked signal, thereby determining whether the wearable device is properly mounted. According to an embodiment, the electronic device may determine whether the ear tip is properly mounted, based on the current user's physique. For example, the electronic device may compare the size of the inner space of the user's ear and the size of the ear tip, thereby determining whether the ear tip is properly mounted.

According to various embodiments, in operation 632, the electronic device may provide an ear tip selection guide. In response to determining that the ear tip is erroneously selected although the wearable device is properly mounted, the electronic device may transmit a guide for selecting the ear tip attached to the wearable device, based on the leaked sound profile. The electronic device may determine, based on the currently received leaked signal and an external signal, that, although the wearable device is currently worn on the user properly, the ear tip is not appropriate for the user's physique. According to an embodiment, if the user selected an ear tip having a size inappropriate for the internal structure of the user's ear, the electronic device may provide a notice such that another ear tip is selected. For example, the wearable device may provide the user with a guide regarding proper ear tip mounting using the speaker.

Figure 7:
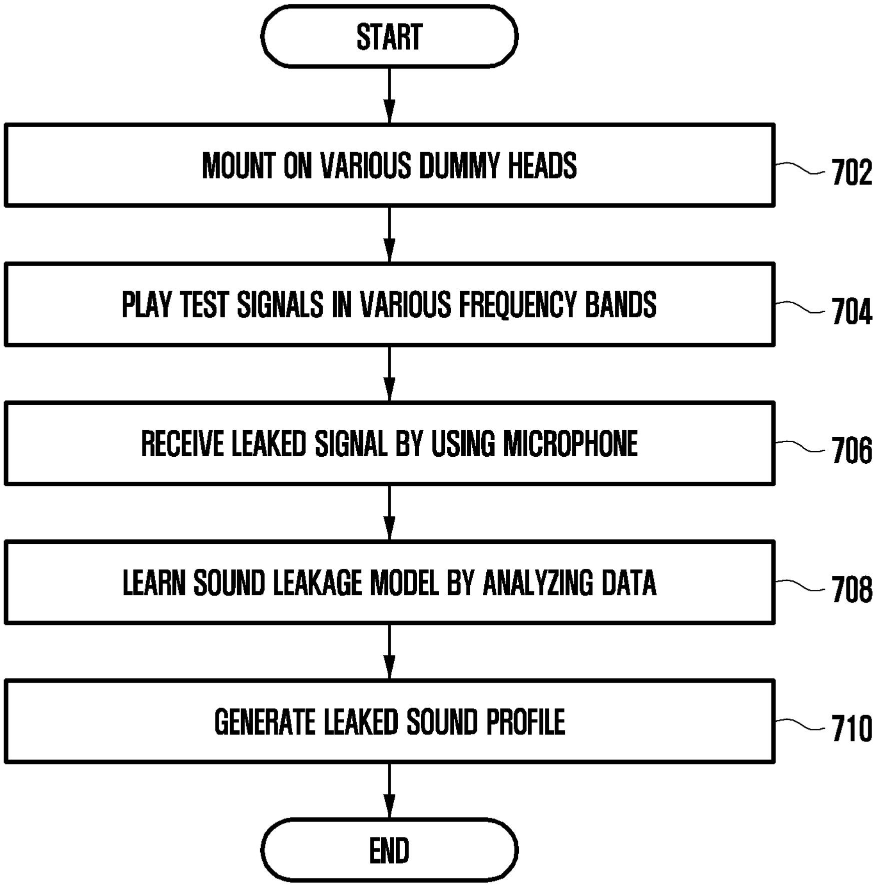
FIG. 7 is a flowchart illustrating an example method in which an electronic device generates a leaked sound profile according to various embodiments.

FIG. 7 is a flowchart illustrating an example method in which an electronic device generates a leaked sound profile according to various embodiments.

According to various embodiments, in operation 702, wearable devices may be mounted on various dummy heads with regard to each wearable device and each ear tip. The dummy heads may be models fabricated in the shape of human heads. According to an embodiment, wearable devices and ear tips may be mounted to closely contact dummy heads. According to an embodiment, the dummy heads may have various shapes, and respective dummy heads may include ear models fabricated differently. Wearable devices may be mounted appropriately for ear models of various dummy heads in order to generate a leaked sound profile. According to an embodiment, wearable devices may be mounted on dummy heads with a different ear tip attached to end portions thereof.

According to various embodiments, in operation 704, the wearable device may play test signals in various frequency bands. The test signals may be output by the electronic device to acquire data for generating a leaked sound profile, and may include various frequency bands (for example, bass-range, mid-range, treble-range). According to an embodiment, at least some of test signals that have been output may leak out of the dummy head even when the wearable device closely contacts the ear model of the dummy head.

According to various embodiments, the electronic device may adjust the volume level of test signals output thereby. The wearable device may acquire audio signals, based on various volume levels of test signals and external environments. According to various embodiments, in operation 706, the wearable device may receive leaked audio signals using the microphone (for example, the microphone 320 in FIG. 3) after being properly mounted on the ear model.

According to various embodiments, on operation 708, the electronic device may learn a sound leakage model by analyzing data regarding received audio signals. The electronic device may use an AI algorithm to learn the sound leakage model, but the algorithm that the electronic device may use to learn the sound leakage model is not limited thereto.

According to various embodiments, on operation 710, the electronic device may generate a leaked sound profile. According to an embodiment, the electronic device may store the leaked sound profile as a lookup table (LUT). The leaked sound profile may include information indicating to what extent audio signals output by the wearable device leak, and in what frequency bands. The leaked sound profile may be information acquired while the wearable device is properly mounted on the ear model, and may be used as a reference for determining whether the wearable device is properly worn by the user, and whether an appropriate ear tip is selected by the user. The leaked sound profile may indicate graphs (for example, the graphs 510*a* and 510*b* in FIG. 5) representing the degree of signal leakage occurring in respective frequency bands. Signal leakage indicated by the leaked sound profile may indicate that the wearable device is mounted in an optimal state in which the user is provided with the highest sound quality.

According to various embodiments, the electronic device may generate different leaked sound profiles, depending on the type of the ear tip attached to the wearable device. For example, the electronic device may generate a first leaked sound profile if a first ear tip is attached to the wearable device, and may generate a second leaked sound profile if a second ear tip is attached to the wearable device.

According to an embodiment, the electronic device may store generated leaked sound profiles in an external server. The electronic device may establish communication connection with the external server and may transmit leaked sound profiles to the external server. According to an embodiment, the electronic device may store leaked sound profiles in the electronic device's own memory.

Figure 8:
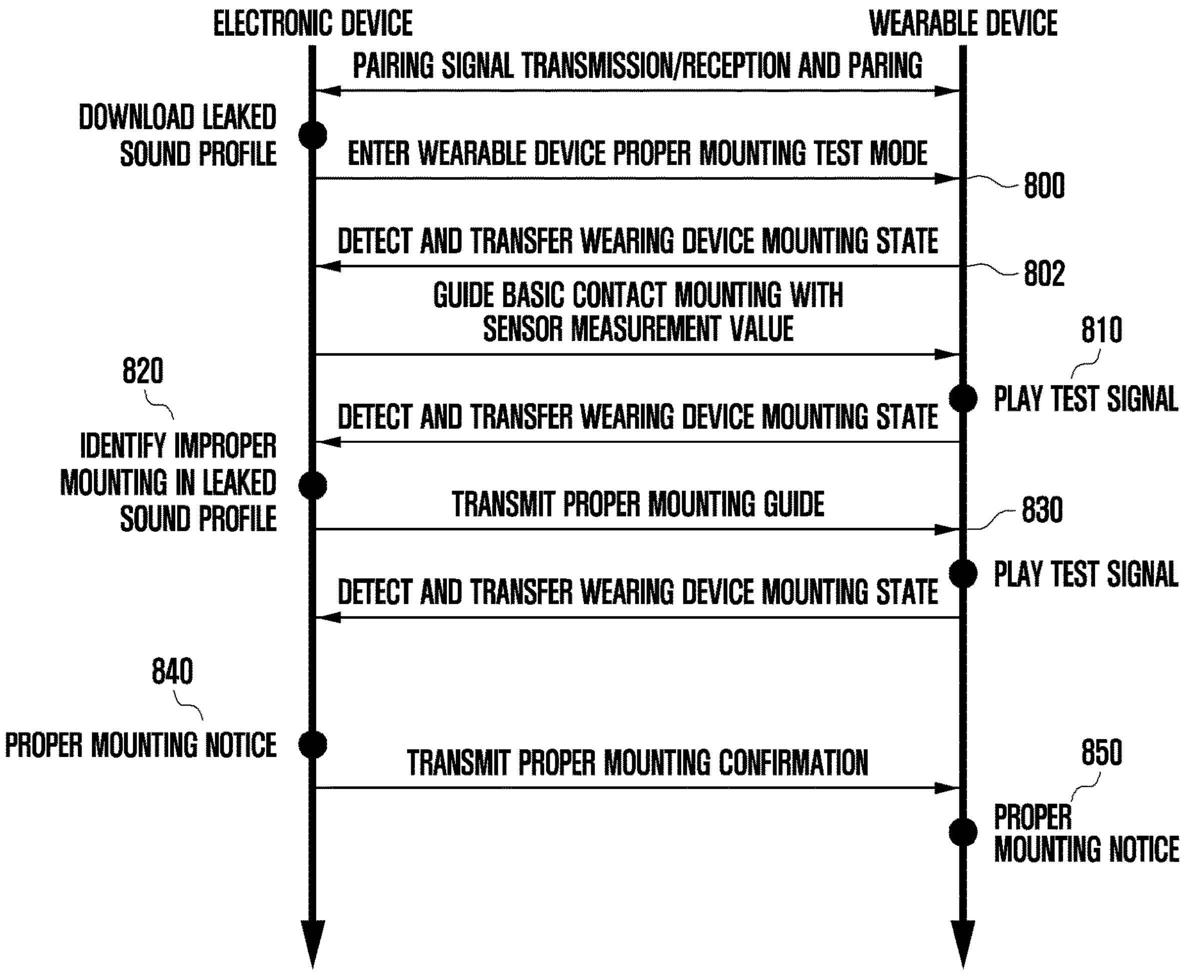
FIG. 8 is a signal flow diagram illustrating an example method in which an electronic device and a wearable device provide a guide for properly mounting the wearable device in an application step according to various embodiments.

FIG. 8 is signal flow diagram illustrating an example method in which an electronic device and a wearable device provide a guide for properly mounting the wearable device in an application step according to various embodiments.

According to various embodiments, the electronic device (for example, the electronic device 101 in FIG. 1A) may establish a communication connection to a wearable device (for example, the wearable device 110 in FIG. 1B). For example, the electronic device may transmit/receive a pairing signal to establish Bluetooth connection to the wearable device. After pairing connection is established, the electronic device may transmit/receive information without having to repeatedly connect to the wearable device multiple times.

According to various embodiments, the electronic device may download a leaked sound profile. For example, the electronic device may download a leaked sound profile (for example, the leaked sound profile 500 in FIG. 5) from an external server. According to an embodiment, the leaked sound profile may be prestored in the electronic device's own memory.

According to various embodiments, in operation 800, the electronic device may enter a wearable device proper mounting test mode. The electronic device may transmit information indicating entry into a wearable device mounting test mode to the wearable device. In operation 802, the wearable device may detect the mounting state of the wearable device in response to receiving the information indicating entry into a wearable device mounting test mode from the electronic device and may transfer the same to the electronic device. For example, the wearable device may sense whether the wearable device is currently mounted in close contact with the user's body using at least a part of the sensor module and may transmit the sensing result to the electronic device. The electronic device may provide a guide for basic contact mounting of the wearable device in response to receiving the mounting state of the wearable device. For example, the electronic device may transmit a basic guide for proper mounting of the wearable device to the wearable device.

According to various embodiments, in operation 810, the wearable device may play a test signal for determining whether the same is properly mounted. For example, the wearable device may play a test signal in response to receiving a guide for basic contact mounting from the electronic device, and may detect at least a part of the test signal, a leaked signal, and an external signal. The wearable device may transfer the detected state of mounting of the wearable device to the electronic device. For example, the wearable device may transfer at least a part of the detected test signal, a leaked signal, and an external signal to the electronic device. The electronic device may determine whether the wearable device is properly mounted, based on at least some of the received signals.

According to various embodiments, the electronic device may identify improper mounting using a leaked sound profile in operation 820. For example, if there is a large difference in contour between a profile generated based on a signal received by the electronic device and a leaked sound profile downloaded in advance, the electronic device may determine that the wearable device is improperly mounted. Upon determining that wearable device is improperly mounted, the electronic device may transfer a proper mounting guide to the wearable device in operation 830.

According to various embodiments, the wearable device may play a test signal again in response to receiving a proper mounting guide. The wearable device may again transmit at least a part of the received signal, a leaked signal, and an external signal to the electronic device. Operations 810, 820, and 830 may be repeatedly performed until the wearable device is deemed to be mounted properly.

According to various embodiments, in operation 840, the electronic device may determine that the wearable device is mounted properly, and may transmit a proper mounting notice to the wearable device. In operation 850, the wearable device may provide the user with a proper mounting notice in response to receiving a proper mounting confirmation from the electronic device. The electronic device may perform operations in FIG. 8 each time the wearable device is worn by the user.

Figure 9A:
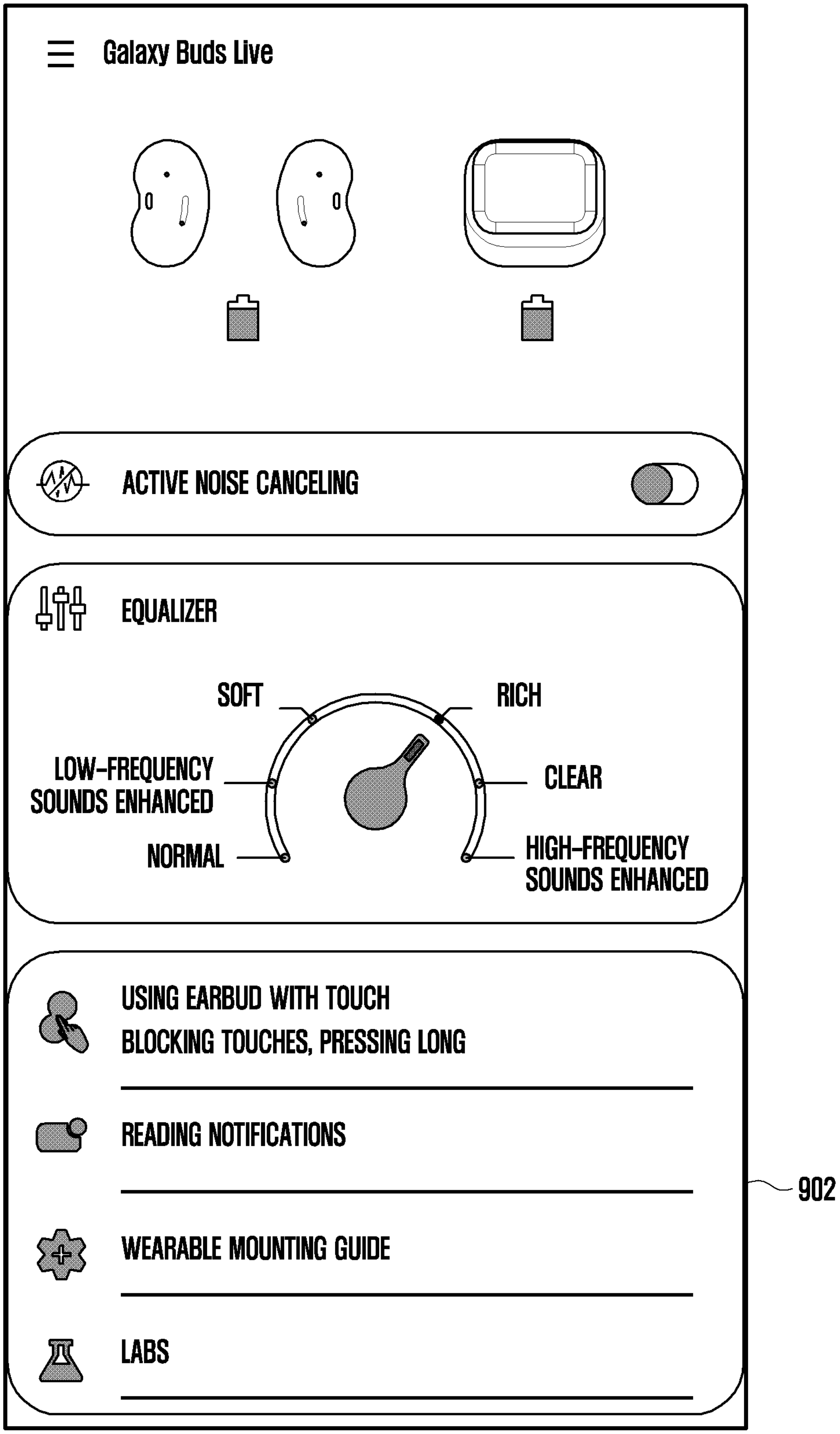
FIG. 9A and FIG. 9B are diagrams illustrating an example UI which may be used to execute a guide for properly mounting a wearable device in an electronic device according to various embodiments.
Figure 9B:
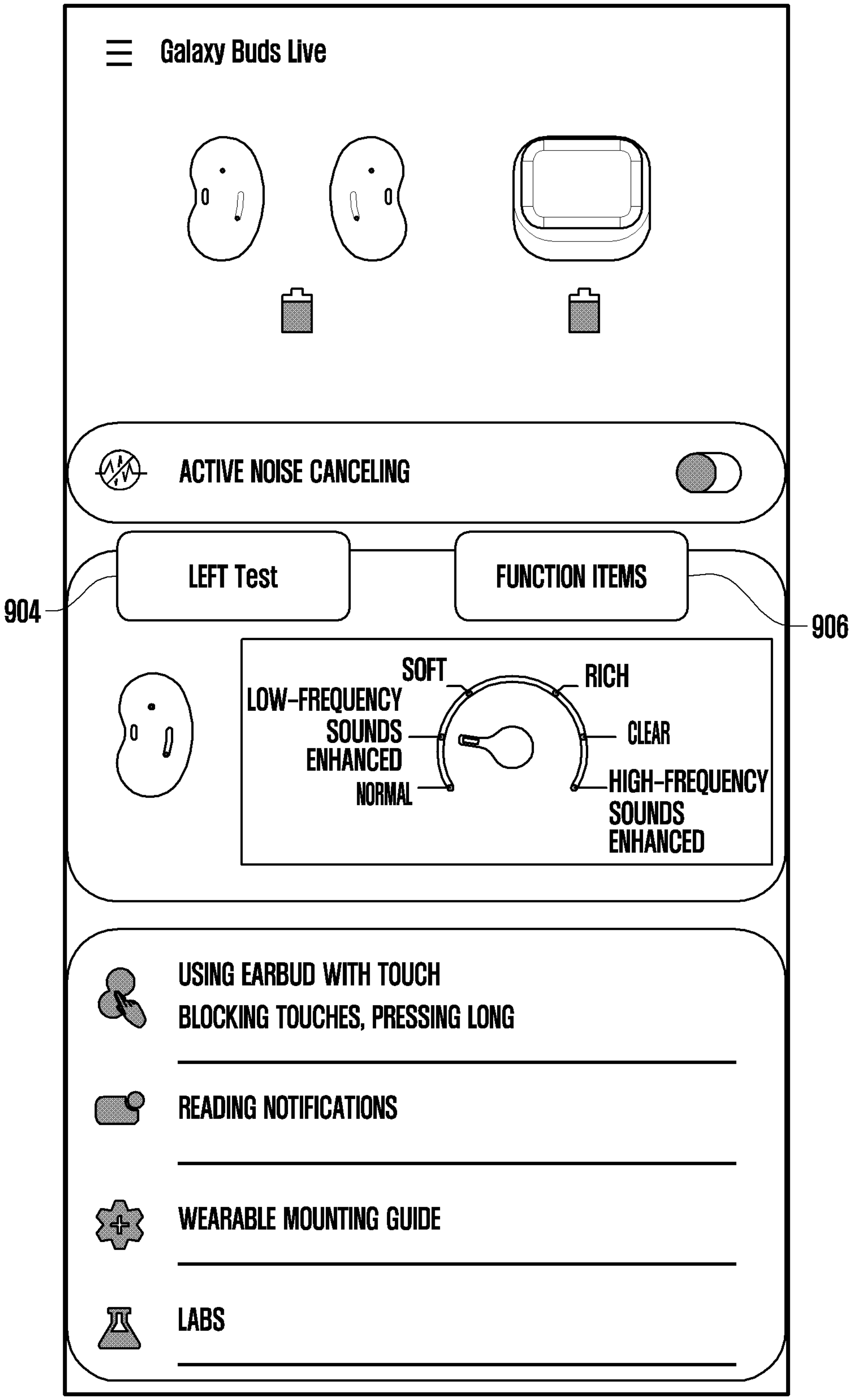

FIG. 9A and FIG. 9B are diagrams illustrating an example UI which may be used to execute a guide for properly mounting a wearable device in an electronic device according to various embodiments.

According to various embodiments, the electronic device (for example, the electronic device 101 in FIG. 1A) may provide a user interface which may be used to test whether the wearable device (for example, the wearable device 110 in FIG. 1B) is properly mounted by the user. Referring to FIG. 9A, the electronic device may display a graphic object 902 which may be used to test whether the wearable device is properly mounted in an area of the display. For example, the electronic device may display, together with the graphic object, a phrase (for example, "Wearable mounting guide") which indicates testing whether the wearable device is properly mounted. The electronic device may test whether the wearable device is properly mounted, based on a user input in response to the graphic object.

FIG. 9B illustrates a user interface displayed when testing whether a wearable device is properly mounted. The electronic device may execute a proper mounting test with regard to a first audio output device (for example, lefthand device) and a second audio output device (for example, righthand device) of the wearable device. For example, when executing a proper mounting test with regard to the first audio output device, the electronic device may display a phrase 904 indicating that the first audio output device is being tested. According to an embodiment, the electronic device may variously adjust the sound quality of test signals that are currently output. For example, the electronic device may output (906) one of a test signal with a soft tone, a test signal with enhanced low-frequency sounds, a test signal with enhanced high-frequency sounds, and a test signal with a clear tone. The above example may be identically applied to the second audio output device.

A method for guiding an electronic device to be mounted according to various example embodiments may include: outputting first signals using a speaker, receiving a second signal leaked out of an object on which the electronic device is mounted, among the first signals, using a microphone, acquiring signal characteristics including the magnitude and frequency of the second signal, determining whether the electronic device is properly mounted and whether an ear tip is properly selected by comparing information acquired from a sensor module, a leaked sound profile, and the signal characteristics, providing an electronic device mounting guide in response to determining that the electronic device is not properly mounted, and providing an ear tip selection guide in response to determining that the ear tip is not properly mounted.

According to various example embodiments, the method may include: outputting test signals using the speaker, and generating the leaked sound profile by mapping the magnitude of sounds leaked out of the object on which the electronic device is mounted, among the test signals, and the frequency band of the test signals.

According to various example embodiments, the generating the leaked sound profile may include: receiving an external signal occurring outside the electronic device using the microphone, and generating the leaked sound profile, further based on the magnitude of the external signal.

According to various example embodiments, the generating the leaked sound profile may include distinguishing the second signal and the external signal, among signals received by the microphone, using a feedback loop.

According to various example embodiments, the generating the leaked sound profile may include generating the leaked sound profile using an artificial intelligence algorithm.

According to various example embodiments, the determining whether the electronic device is properly mounted may include further determining whether the electronic device is properly mounted, based on the magnitude of the first signals.

According to various example embodiments, the providing the guide may include providing the electronic device mounting guide or the ear tip selection guide by providing an audio notice using the speaker.

According to various example embodiments, the providing the guide may include providing the electronic device mounting guide or the ear tip selection guide, based on physical characteristics of a user on which the electronic device is mounted.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
an ear tip configured to be attached to/detached from the electronic device;
a microphone;
a speaker;
a sensor module comprising at least one sensor configured to sense information of the electronic device;
memory configured to store a leaked sound profile indicating a relation between a magnitude of signals leaked out of an object on which the electronic device is mounted, among signals output by the electronic device, and a frequency of signals which are output; and
at least one processor, comprising processing circuitry, operatively connected to the microphone, the speaker, and the memory,
the memory storing instruction that, when executed by the at least one processor, individually and/or collectively, cause the electronic device to:
output first signals using the speaker;
receive a second signal leaked out of the object on which the electronic device is mounted, among the first signals, using the microphone;
acquire signal characteristics representing a relation between the magnitude of the second signal and the frequency of the second signal;
determine whether the electronic device is properly mounted and whether the ear tip is properly selected, based on a result of comparing information acquired from the sensor module, the leaked sound profile, and the signal characteristics;
provide an electronic device mounting guide in response to determining that the electronic device is not properly mounted; and
provide an ear tip selection guide in response to determining that the ear tip is not properly mounted.

2. The electronic device of claim 1, wherein the instructions, when executed by the at least one processor, cause the electronic device to:
output test signals using the speaker; and
generate the leaked sound profile by mapping the magnitude of sounds leaked out of the object on which the electronic device is mounted, among the test signals, and a frequency band of the test signals.

3. The electronic device of claim 2, wherein the instructions, when executed by the at least one processor, individually and/or collectively cause the electronic device to:
receive an external signal occurring outside the electronic device using the microphone; and
generate the leaked sound profile, further based on the magnitude of the external signal.

4. The electronic device of claim 3, wherein the instructions, when executed by the at least one processor, individually and/or collectively, cause the electronic device to: distinguish the second signal and the external signal, among signals received by the microphone, using a feedback loop.

5. The electronic device of claim 4, wherein the instructions, when executed by the at least one processor, individually and/or collectively, cause the electronic device to: generate the leaked sound profile using an artificial intelligence algorithm.

6. The electronic device of claim 1, wherein the instructions, when executed by the at least one processor, individually and/or collectively, cause the electronic device to: determine whether the electronic device is properly mounted, based on the magnitude of the first signals.

7. The electronic device of claim 1, wherein the instructions, when executed by the at least one processor, individually and/or collectively, cause the electronic device to: provide the electronic device mounting guide or the ear tip selection guide by providing an audio notice using the speaker.

8. The electronic device of claim 1, wherein the instructions, when executed by the at least one processor, individually and/or collectively, cause the electronic device to: provide the electronic device mounting guide or the ear tip selection guide, based on physical characteristics of a user on which the electronic device is mounted.

9. The electronic device of claim 1, further comprising a communication module comprising communication circuitry,
wherein the instructions, when executed by the at least one processor, individually and/or collectively, cause the electronic device to:
establish communication connection to an external server using the communication module; and
acquire the leaked sound profile from the external server and store the acquired leaked sound profile in the memory.

10. The electronic device of claim 1, wherein the instructions, when executed by the at least one processor, individually and/or collectively, cause the electronic device to: store the leaked sound profile as a lookup table (LUT).

11. A method for guiding an electronic device to be mounted, the method comprising:
outputting first signals using a speaker;
receiving a second signal leaked out of an object on which the electronic device is mounted, among the first signals, using a microphone;
acquiring signal characteristics comprising a magnitude and frequency of the second signal;
determining whether the electronic device is properly mounted and whether an ear tip is properly selected by comparing information acquired from a sensor module, a leaked sound profile, and the signal characteristics;
providing an electronic device mounting guide in response to determining that the electronic device is not properly mounted; and
providing an ear tip selection guide in response to determining that the ear tip is not properly mounted.

12. The method of claim 11, comprising:
outputting test signals using the speaker; and
generating the leaked sound profile by mapping the magnitude of sounds leaked out of the object on which the electronic device is mounted, among the test signals, and a frequency band of the test signals.

13. The method of claim 12, wherein the generating of the leaked sound profile comprises:
receiving an external signal occurring outside the electronic device using the microphone; and
generating the leaked sound profile, further based on the magnitude of the external signal.

14. The method of claim 13, wherein the generating of the leaked sound profile comprises distinguishing the second signal and the external signal, among signals received by the microphone, using a feedback loop.

15. The method of claim 14, wherein the generating of the leaked sound profile comprises generating the leaked sound profile using an artificial intelligence algorithm.

16. The method of claim 11, wherein the determining of whether the electronic device is properly mounted comprises further determining whether the electronic device is properly mounted, based on the magnitude of the first signals.

17. The method of claim 11, wherein the providing of the guide comprises providing the electronic device mounting guide or the ear tip selection guide by providing an audio notice using the speaker.

18. The method of claim 11, wherein the providing of the guide comprises providing the electronic device mounting guide or the ear tip selection guide, based on physical characteristics of a user on which the electronic device is mounted.

19. An electronic device comprising:

a display;

a communication module comprising communication circuitry;

a memory; and at least one processor, comprising processing circuitry, operatively connected to the display, the communication module, and the memory, wherein the at least one processor, individually and/or collectively, is configured to:

establish communication connection to an external device using the communication module;

acquire information regarding a mounting state of the external device from the external device;

determine whether the external device is properly mounted utilizing a leaked sound profile, the leaked sound profile indicating at least a relation between magnitude of signals leaked out of the external device and signals output by the external device; and transmit the information regarding the mounting state and output the visualized information to the display.

20. The electronic device of claim 19, wherein at least one processor, individually and/or collectively, is configured to:

execute a determined application;

generate graphic object indicating a method for mounting the external device, based on an input regarding the application; and output the generated graphic object to the display such that the method for mounting the external device is provided to a user as a guide.

* * * * *